United States Patent [19]

Dockery

[11] 4,036,756
[45] July 19, 1977

[54] AQUARIUM FILTER ASSEMBLY

[76] Inventor: Denzel J. Dockery, 3317 E. Bristol Road, Burton, Mich. 48529

[21] Appl. No.: 585,691

[22] Filed: June 10, 1975

[51] Int. Cl.² .................................. E04H 3/20
[52] U.S. Cl. ........................... 210/169; 137/142
[58] Field of Search ............ 210/169, 416; 119/5; 137/142

[56] References Cited

U.S. PATENT DOCUMENTS

| 117,750 | 8/1971 | De Lagillardles | 137/142 |
| 264,197 | 9/1882 | Saunders | 137/142 |
| 2,295,982 | 9/1942 | Widman | 210/169 X |
| 2,363,539 | 11/1944 | Loughridge | 137/142 |
| 2,772,867 | 12/1956 | Cleckner | 119/5 X |
| 3,321,081 | 5/1967 | Willinger | 210/169 |
| 3,511,376 | 5/1970 | Sesholtz | 119/5 |
| 3,525,435 | 8/1970 | Conner, Jr. | 210/169 |
| 3,584,602 | 6/1971 | Stasio | 119/5 |
| 3,734,853 | 5/1973 | Horrath | 210/169 |
| 3,738,620 | 6/1973 | Ennis | 210/169 |
| 3,747,762 | 7/1973 | White | 210/169 |
| 3,771,544 | 11/1973 | Horrath | 210/169 |

Primary Examiner—Theodore A. Granger
Attorney, Agent, or Firm—Gifford, Chandler, Sheridan & Sprinkle

[57] ABSTRACT

An aquarium filter comprising a siphon housing assembly and a filter holding tank assembly. The siphon housing assembly supports a pump assembly which functions to draw water from the aquarium through the siphon housing assembly and to pump the water to the filter holding tank assembly. The pump assembly utilizes a centrifugal impeller to pump the water through a pump outlet to the filter holding tank assembly. In addition, a venturi outlet is provided in the pump assembly near the pump outlet which produces a venturi vacuum to siphon water from the aquarium and through the siphon housing assembly.

The pump assembly pumps water from the siphon housing assembly into a filter bag situated in the filter holding tank assembly. The filter bag is porous and coated inside with diatomaceous earth for removing impurities from the aquarium water. The filter holding tank assembly includes an overflow return area for returning the filtered water to the aquarium.

11 Claims, 6 Drawing Figures

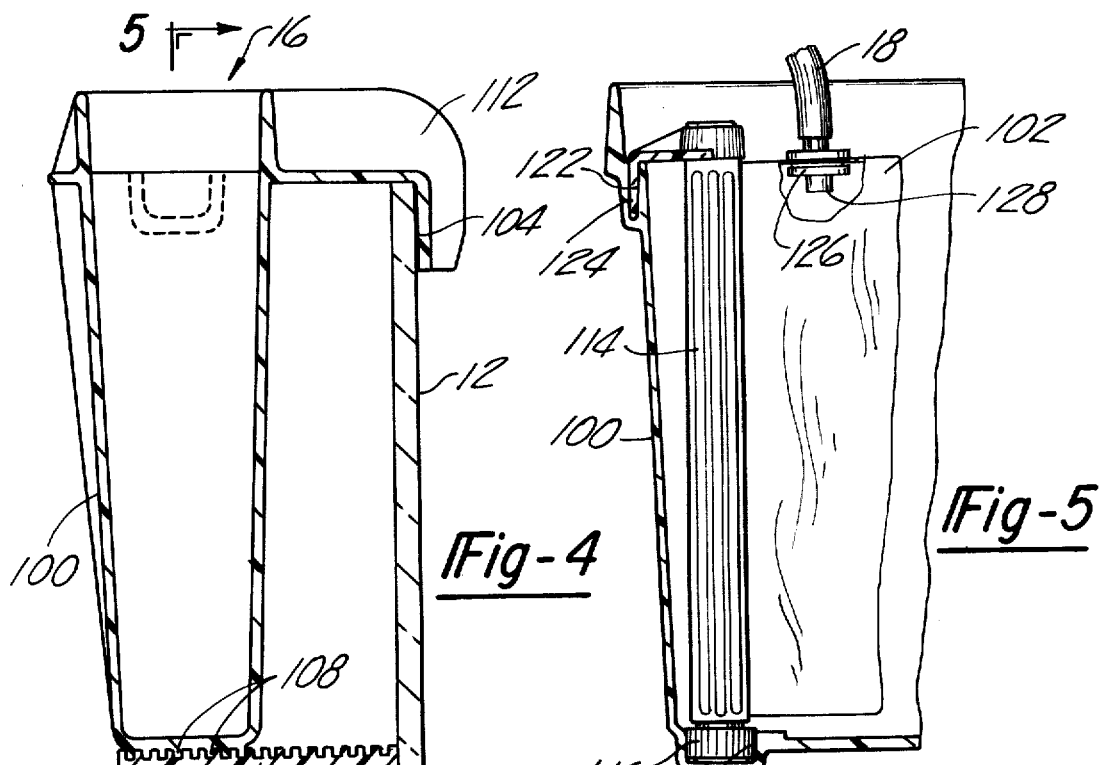
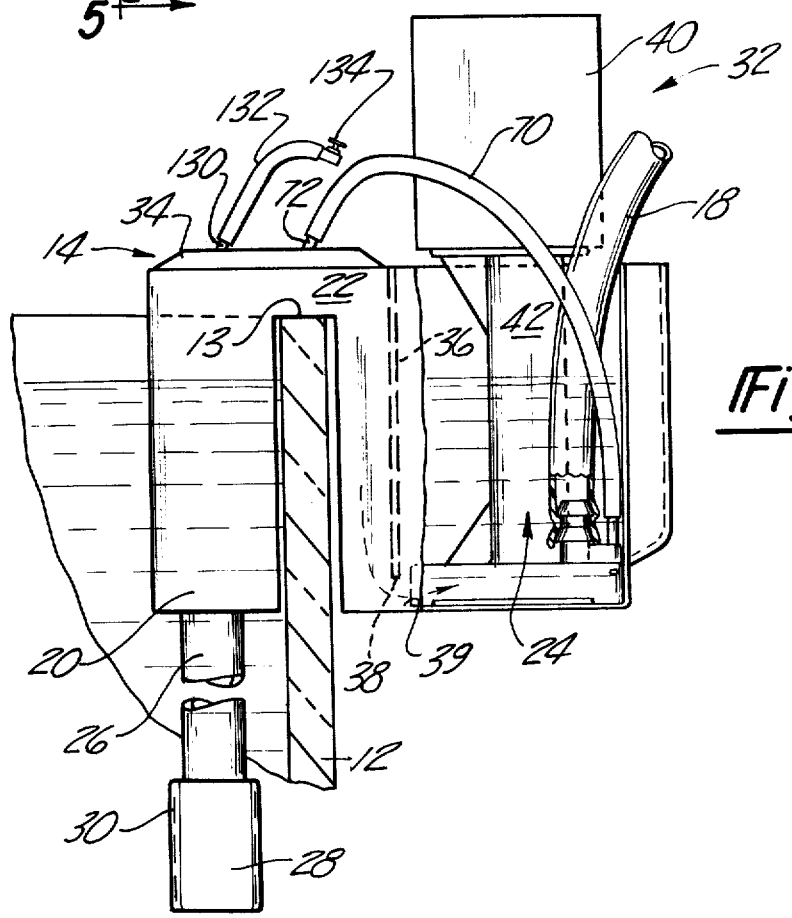

4,036,756

AQUARIUM FILTER ASSEMBLY

BACKGROUND OF THE INVENTION

I. Field of the Invention

The present invention relates generally to aquarium filter systems and, more particularly, to an aquarium filter system which generates and utilizes a venturi vacuum to siphon water from the aquarium and into the filtering system.

II. Description of the Prior Art

Aquariums, both for home and professional use, have enjoyed widespread popularity in recent years. As is well known in the art, a filtering system for removing impurities and waste material from the aquarium water constitutes an integral part of all aquarium systems. Thus, due to the widespread popularity of aquariums, many previously known filter systems have been devised for removing impurities from the aquarium water. These previously known aquarium filter systems, however, suffer several disadvantages unknown to the present invention.

One disadvantage of such aquarium filtering systems is that the pumps on the filtering system are not self-priming. Priming the pumps of such filtering systems has proven to be a messy and inconvenient operation, at best, and it often involves a complicated and difficult procedure.

Another disadvantage with the previously known aquarium filtering systems is that in such systems the filter pumps are actuated downstream from the filter and often become clogged with overflow waste material from the filter. In order to clean the pump, it must be disassembled and cleaned. The disassembly of the pump is not only a messy and time consuming job, but also is a complicated operation, often times requiring the services of someone skilled in the pump design.

Another disadvantage of the previously known aquarium filtering systems is that the volume flow of water through the filtering system is often insufficient for the size of the aquarium involved. With an insufficient volume of flow through the filter system, waste material is inadequately removed from the aquarium water. The unremoved waste material not only creates an unsightly appearance for the aquarium but also provides an unhealthy environment for the aquatic pets within the aquarium.

SUMMARY OF THE PRESENT INVENTION

The aquarium filtering system of the present invention overcomes the disadvantages of previously known aquarium filtering systems by providing a high volume flow, self-priming pump for the filtering system. The aquarium filter system of the present invention comprises a siphon housing assembly and a filter holding tank assembly. Water is siphoned, in a manner described hereinafter, from the aquarium, through the siphon housing and into a pump tank which is integral with the siphon housing. A high volume pump is situated in the pump tank and pumps the aquarium water from the pump tank to the filter holding tank assembly. In addition to the standard high pressure output from the pump assembly, the pump assembly includes a venturi outlet which produces a venturi vacuum. The venturi vacuum is coupled to the siphon housing assembly to siphon water from the aquarium into the pump tank.

The filter holding tank assembly basically comprises a filter bag situated in a filter holding tank. The filter bag is porous and preferably coated inside with diatomaceous earth for removing impurities from the aquarium water. The high pressure output from the pump assembly is connected to the filter bag via a water tube so that the aquarium water is pumped from the pump tank into the interior of the filter bag, and out through the bag into the filter holding tank. The filter holding tank includes an overflow return area so that the filtered water is returned to the aquarium.

The pump of the present invention is self-priming in that the venturi vacuum operates to siphon water from the aquarium into the pump tank the moment the pump is turned on. Similarly, since the pump assembly is upstream from the filter bag, the waste material which collects in the filter bag does not contact and cannot clog the pump assembly. Thus, disassembly of the pump for cleaning is not required with the present invention.

BRIEF DESCRIPTION OF THE DRAWINGS

Other advantages of the present invention will become apparent by reference to the following detailed description when read in conjunction with the accompanying drawings wherein like reference characters refer to like parts throughout the several views, and in which:

FIG. 4 is a side cross-sectional view of the filter holding tank assembly;

FIG. 5 is a cross-sectional view taken along line 5—5 in FIG. 4; and

FIG. 6 is a side view of the siphon housing assembly of the present invention and with parts removed for clarity.

DETAILED DESCRIPTION OF THE PRESENT INVENTION

Figure 1:
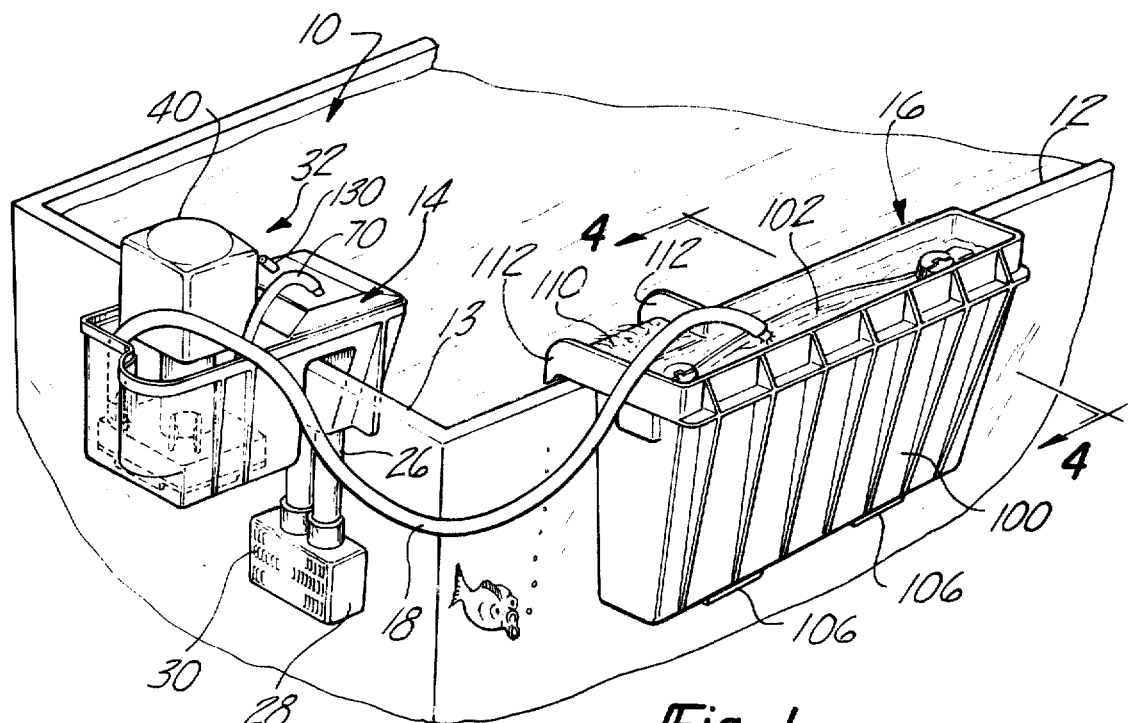
FIG. 1 is a perspective view of the aquarium filter system of the present invention.

Referring primarily to FIGS. 1 and 6, the aquarium filtering system 10 is shown attached to an aquarium tank 12. The filtering system 10 comprises two separate assemblies, a siphon housing assembly 14 and a filter holding tank assembly 16, which are connected only by a water tube 18. The siphon housing assembly, with its associated hardware, functions to pump the aquarium water via the water tube 18 into the filter holding tank assembly 16, as will be more clearly understood hereinafter.

The siphon housing assembly, preferably constructed of plastic, fits over the lip 13 of tthe aquarium tank 12 and forms three separate but interconnected fluid chambers, namely, a siphon chamber 20, a crossover chamber 22 and a pump tank chamber 24. The siphon chamber 20 is immersed in the aquarium water and fluidly communicates with the aquarium water via a pair of siphon tubes 26 and a siphon head 28. As is well known in the art, the siphon head 28 includes a plurality of slots 30 so that the aquarium water may freely flow into the siphon head 28 through the slots 30, up through the siphon tubes 26 and into the siphon chamber 20.

The pump tank chamber 24 is situated exteriorly of the aquarium 12 and supports a pump assembly 32 therein. The crossover chamber 22 fluidly interconnects the siphon chamber 20 with the pump tank chamber 24.

The portion of the siphon housing assembly 14 forming the crossover chamber 22 is supported by the upper lip 13 of the aquarium 12 so that the crossover chamber 22 is necessarily above the water level of the aquarium 12. A lid 34 encloses the crossover chamber 22 and includes a vertical wall section 36 which extends downwardly into the pump tank chamber 24. The lower edge 38 of the wall section 36 is upwardly disposed from the bottom of the pump tank 24, thereby forming a rectangular opening 39 between the crossover chamber 22 and the pump tank chamber 24.

Figure 2:
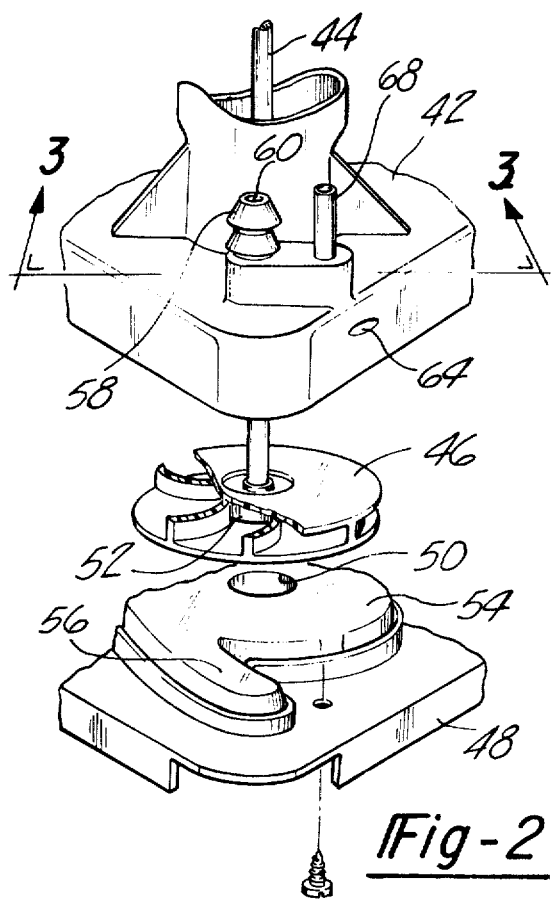
FIG. 2 is an exploded perspective view showing the pump assembly of the present invention and with parts broken away for clarity.
Figure 3:
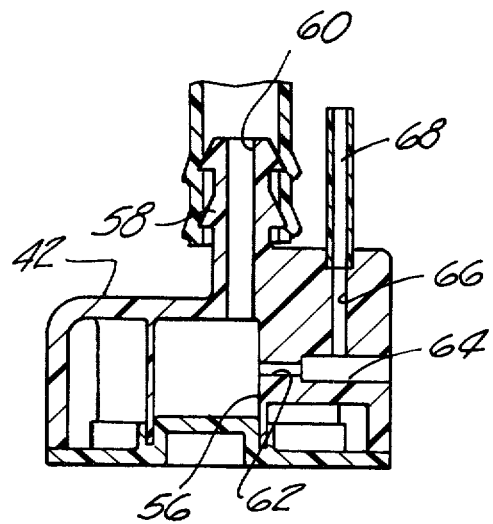
FIG. 3 is a cross-sectional view taken along line 3—3 in FIG. 2.

Referring now to FIGS. 2, 3 and 6, the pump assembly 32 includes a motor 40 mounted above a pump stand 42. The motor 40 drives a shaft 44 which is connected to a centrifugal impeller 46. The pump stand 42 includes a base 48 which encases the impeller 46 between the base 48 and the pump stand 42. The base 48 has an aperture 50 which registers with an aperture 52 in the impeller 46 so that water can flow up through the aperture 50 in the base 48 into the impeller 46.

In a conventional fashion, the impeller 46 is encased in a circular race 54 formed by the junction of the pump stand 42 and the base 48. Likewise, an exit or dogleg 56 is provided along a portion of the periphery of the race 54 so that, as the impeller 46 rotates, the centrifugal force of the water forces water into the dogleg 56.

A high pressure pump outlet nozzle 58, having a vertical passageway 60 therethrough, is provided at the end of the dogleg 56. Thus in operation, as the impeller 46 is driven by the motor 40, water is drawn up through the aperture 50 in the base 48 and driven into the dogleg 56 and out through the passageway 60 of the pump outlet nozzle 58.

One novelty of the present invention resides in the provision of a generally horizontal venturi outlet passage 62 provided in the pump stand 42 at the end of the dogleg 56. The venturi outlet passage 62 is more restricted than the passage 60 so that while most of the water from the impeller will pass through the passage 60, a portion of the water will be forced through the venturi passage 62. The venturi passage 62 includes an enlarged diameter portion 64 which is intersected at a substantially right angle by a generally vertical venturi vacuum passage 66.

A small conduit 68 is forced into the passageway 66 to provide a coupling point to the passageway 66. The conduit 68 in turn is coupled by a tube 70 to a nipple 72 formed in the top of the lid 34 of the siphon housing 14.

As water is forced through the restricted passageway 62 and through the enlarged portion 64, this water flow will create a partial vacuum in the venturi passage 66. Thus, as long as the venturi vacuum continues in the venturi passage 66, air will be withdrawn from the crossover chamber 22 via the nipple 72 and tube 70, thus creating a siphon and drawing water up from the siphon chamber 20 into the crossover chamber 22.

The aquarium filtering system 10 of the present invention also includes a novel filter bag assembly. Referring now primarily to FIGS. 1, 4 and 5, the filter holding tank assembly 16 generally comprises a filter holding tank 100 and a filter bag 102. The filter holding tank 100 includes a lip 104 designed to fit over and retain the tank 100 on the aquarium wall 12. A pair of ribbed, stand-off brackets 106 are designed to snap into matching ribs 108 at the base of the tank 100 and rest against the aquarium tank 12 so as to maintain the tank 100 in a generally vertical position. It should be apparent that the stand-off brackets 106 are adjustable to accommodate different widths of aquarium tanks 12. An overflow return area 110, with side walls 112, is constructed along a portion of the lip 104 so that water may flow from the tank 100 back into the aquarium 12.

The filter bag 102 is disposed within the filter holding tank 100. The filter bag 102 is porous and preferably coated with diatomaceous earth for filtering out the waste material from the aquarium water. In order to properly position the filter bag 102 within the tank 100, a filter bag clamp 114 is attached to each end of the filter bag 102. A lower retaining ring 116 fits into a recess 118 formed in the base of the tank 100 and clamps around the lower end of the clamp 114. Similarly, an upper retaining ring 120 encloses the upper end of the clamp 114 and is secured to the tank 100 by a lip 120 which fits in a receiving recess 122 in the tank 100. By rigidly clamping the filter bag 102 to the tank 100, the filter bag can accommodate a high volume water flow without severe deformation of the filter bag 102.

An inlet nipple 126 is fastened to the upper edge of the filter bag 102 so that the water tube 18 may be connected to the nipple 126. A standard one-way check valve assembly 128 is also preferably provided in conjunction with the nipple 126 so that water may flow from the tube 18 into the interior of the filter bag 102, but not conversely. The opposite end of the water tube 18 is secured to the pump outlet nozzle 58.

The complete operation of the filter aquarium system 10 of the present invention may be now described in detail. When the siphon housing assembly 14 and the filter holding tank assembly 16 are first placed on the aquarium 12, the filter holding tank 100 and the pump tank chamber 24 must be filled with water. Naturally, the crossover chamber 22 will at this time be filled with air. The water tube 18, which connects the pump outlet nozzle 58 to the filter bag 102, is them crimped and the motor 40 is started. Since the water tube 18 is crimped, the impeller 46 merely circulates water in the pump tank 24 by forcing water through the venturi passage 62. As previously described, the flow of water through the passage 62 and the enlarged portion 64 will create a vacuum in the passage 66, which in turn will draw air from the crossover chamber 22 through the tube 70 and out through the enlarged portion 64 of the venturi outlet. As air is evacuated from the crossover chamber 22, water is accordingly siphoned up from the siphon chamber 20 and into the crossover chamber 22. When the air is more or less completely evacuated from the crossover chamber 22, the water tube 18 is then uncrimped so that the pump forces water through the nozzle 58 and water tube 18, and into the filter bag 102. As water is pumped from the pump tank 24, water flows from the aquarium 12 into the pump tank chamber 24 due to the natural tendency of water to maintain a water level in the pump tank 24 at the same level as the aquarium 12.

The aquarium water is then filtered as it flows from the interior of the filter bag 102, through the diatomaceous earth and the bag 102, and into the holding tank 100. As the water level increases in the holding tank 100, the filter water flows over the overflow return area 110 and back into the aquarium 12.

If aeration of the water is desired, an additional nipple 130, tube 132 and valve 134 may be provided in the lid 34 of the siphon housing 14. By opening the valve 134, a small amount of air flows into the crossover chamber 22. As has been already described, the air is drawn from the chamber 22 by the tube 70 and exits from the venturi outlet 64 as very fine air bubbles. Many of these air bubbles are pumped into the filter bay 102 under relatively highh pressure whereupon the pressure dissolves the air into the water at a comparatively fast rate. In this manner, venturi outlet 64 provides the maeans for aeration of the aquarium water.

Aeration of the water by opening valve 134 also efficiently permits protein to be skimmed from the water. Sub-micron particles which cannot be easily removed from the water by filtering, are separated from the water by adsorbitive bubble separation during aeration as the venturi breaks the air into very fine air bubbles. The particles rise to the surface of the water as a thick foam and may be easily collected and eliminated from the aquarium water.

It should be also be apparent that the tube 132 and valve 134 may be connected to a source of gas, such as nitrogen, carbon dioxide, oxygen, or the like, for injecting the gas into the aquarium water. Such gases are often injected into aquarium water for their therapeutic effect on various aquatic species.

It can thus be seen that the aquarium filtering system 10 of the present invention provides for advantages unknown in the prior art. Unlike many previously known aquarium filter systems, the system 10 of the present invention is self-priming, thus eliminating the messy and complex priming operations of previously known filter systems.

In addition, unlike previously known systems, in the present system the pump 32 is situated upstream from the filter bag 102 so that accumulated waste material at the filter bag 102 does not clog the pump 32 or pump impeller 46. In the event of power failure or the like, the check valve 128 in the filter bag inlet 126 prevents any backflow of waste material from the filter bag 102 to the pump tank 24.

Improvements and modifications to the present invention will become apparent to those skilled in the art to which it pertains without deviating from the spirit of the invention as defined by the scope of the appended claims.

I claim:

1. For use with an aquarium tank having at least one vertical wall and an interior at least partly filled with water, a device comprising,
   a filter having an inlet and an outlet with said filter outlet open to the interior of said aquarium tank,
   a housing adapted to be mounted on one wall of said aquarium tank, said housing having a first hollow portion positioned on the interior of and extending downwardly into the tank so that the interior of the housing first portion is in fluid communication with the water in the interior of the tank, a second hollow portion adapted to sit upon said last mentioned wall of said tank so that the interior of the housing second portion is open to the upper end of the interior of the housing first portion, a third hollow portion positioned exteriorly of said tank, the interior of said third portion forming a downwardly extending fluid channel open at its top to the interior of said second housing portion, and a fourth hollow portion disposed exteriorly of said tank and horizontally adjacent said third housing portion, wherein the interior of said fourth portion is in fluid communication with the bottom of said fluid channel and whereby fluid communication is established between the interiors of said tank and said housing fourth portion through the interiors of said housing first, second, and third portions,
   pump means carried in said housing fourth portion, said pump means having a housing, said pump housing having a fluid inlet open to the interior of said fourth housing portion and a fluid outlet fluidly connected to said filter inlet, and
   venturi passage means integrally formed in said pump housing for creating a partial vacuum at a port in said pump housing upon actuation of said pump means, and
   conduit means for connecting said port to an upper part of said housing second portion and open to the interior of said housing second portion, whereby upon actuation of said pump means, said venturi passage means and said conduit means evacuate the interior of said housing second portion and siphon water from said aquarium tank into the interior of the housing second portion to thereby establish water flow from said aquarium tank into the interior of said housing fourth portion.

2. The invention as defined in claim 1 and including a nipple on the top of said housing second portion and a valve associated with said nipple to variably introduce a gas into the interior of said housing second portion for aeration of the aquarium water.

3. The invention defined in claim 1 wherein said filter device comprises:
   a filter holding tank attached to said aquarium and having an overflow return area for returning water to the aquarium; and
   a porous filter bag disposed in said filter holding tank wherein said pump outlet is fluidly connected to the interior of said filter bag.

4. The invention as defined in claim 3 wherein said filter bag is secured by clamps within said filter holding tank.

5. The invention as defined in claim 3 wherein said filter bag is coated with diatomaceous earth.

6. The invention as defined in claim 5 and including a one-way check valve disposed between said high pressure fluid outlet and said filter bag so as to permit fluid flow only from said fluid outlet to said filter bag.

7. The invention as defined in claim 1 wherein said pump means further comprises a centrifugal impeller rotatably carried in said pump housing and drive means for rotatably driving said impeller.

8. The invention as defined in claim 1 wherein said venturi passage means further comprises,
   a venturi passage having an inlet open to said pump outlet and an outlet open to the interior of the housing fourth position, and
   a venturi vacuum passage open at one end to said venturi passage and connected at its other end to said port.

9. The invention defined in claim 8 wherein said venturi passage is more restricted than said pump outlet.

10. The invention as defined in claim 9 wherein the inlet of said venturi passage is more restricted than its outlet.

11. The invention as defined in claim 10 wherein said venturi vacuum passage intersects the enlarged outlet of said venturi passage at substantially a right angle.

* * * * *